Patented June 15, 1954

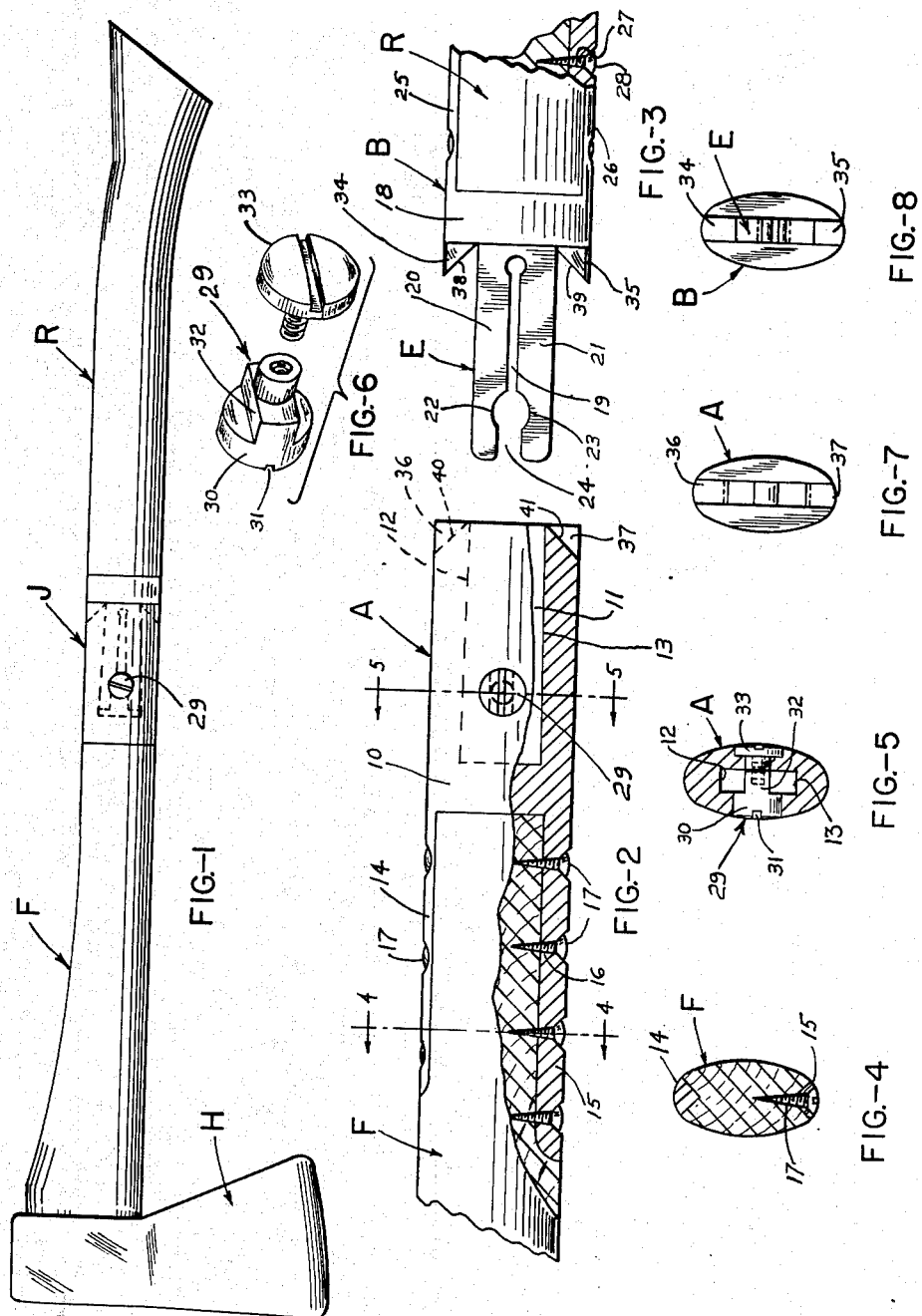
June 15, 1954  S. C. BRANDENBURG ET AL  2,681,240
JOINT
Filed Oct. 9, 1950
INVENTORS
STANLEY C. BRANDENBURG
DAVID C. TAYLOR
BY Lamphere and Van Valkenburgh
ATTYS.

2,681,240

UNITED STATES PATENT OFFICE 2,681,240

JOINT

Stanley C. Brandenburg and David C. Taylor, Denver, Colo.

Application October 9, 1950, Serial No. 189,146

5 Claims. (Cl. 287—119)

This invention relates to joints and more particularly a quickly and easily attachable and detachable joint for two members.

One of the objects of our invention is to produce a joint of the kind referred to which, when in operative condition, will rigidly and securely join members together.

Another object is to construct a joint for two members which will have parts carried by each of the members so constructed as to permit an interfitting relation and when in such condition can be rigidly locked together by a simple operation.

Still a further and more specific object is to produce an improved, quickly attachable and detachable joint in which one part is provided with a socket portion and another part is provided with portions receivable in the socket with the socket and receivable portions being so constructed that the parts can be rigidly locked together by an expansion of the receivable portions.

Yet a further object is to produce an improved joint in which one part has a socket which gradually increases in cross sectional area inwardly from its open end and a cooperating part has a longitudinally slotted extension for insertion in the socket part and after insertion can be expanded into tight engagement with the socket surface by a member carried by the socket member and arranged to spread the parts of the inserted extension which are on opposite sides of the longitudinal slot.

Other objects of our invention will become apparent from the following description when taken in connection with the accompanying drawings in which:

Figure 1 is a side view of an axe shown, by way of example, as an article in the form of the axe handle in which our improved joint can be embodied so that the handle will have separable sections in order that the axe, when not to be used, can be made to occupy a shorter space and thereby facilitate packaging and carrying, yet the sections when joined together will result in the handle being as rigid as if it were one integral piece;

Figure 2 is a side view partly in section of the socket member of the joint;

Figure 3 is a side view partly in section of the other member of the joint;

Figure 4 is a cross sectional view taken on the line 4—4 of Figure 2;

Figure 5 is a cross sectional view taken on the line 5—5 of Figure 2;

Figure 6 is an exploded perspective view of the rotatable structure for locking the joint members together; and Figures 7 and 8 are end views of the two members of the joint.

Referring to the drawings, the disclosed axe handle having our improved joint embodied therein has a forward section F and a rear section R, preferably made of wood and being joined together by our joint J embodying two cooperating members A and B. As shown in Figure 1, the joint is in operative position to connect the axe handle sections F and R together in a rigid manner and when so connected the axe handle and the axe head H, attached to the forward section F, will then constitute an axe which will be equivalent to an axe which would have a one-piece handle.

As is best shown in Figure 2, the member A of the improved joint J comprises a body 10 which may be made out of any suitable metal such as aluminum or steel. It also can be cast as one piece if desired, and even made by a laminated construction. In the body portion 10 of the member A there is provided a socket 11. This socket is preferably of rectangular cross section and extends longitudinally from the rear end of the body 10 towards the forward end. The width of the socket is uniform throughout its entire length from the open end inwardly. The depth of the socket, which is determined by the top and bottom walls 12 and 13 of the socket, increases in a gradual manner from the open end to the inner end of the socket. In other words, the top and bottom walls 12 and 13 of the socket diverge at a slight angle to each other in a direction away from the open end of the socket.

At the forward end of the body 10 of the joint member A there are two forwardly extending prongs 14 and 15 which will be integral with the body member. These prongs have a general triangular cross section, as can be seen in the sectional view of Figure 4, with the apex portion of the triangle on the inside of each prong. The prongs are provided with a series of spaced apart holes 16 to receive screws 17 for attaching the joint member A to the rear end of the wooden forward section F of the handle. This section of the handle will be longitudinally grooved on its top and bottom side so as to receive the prongs 14 and 15 in the grooves. When these prongs are attached to the forward section F by the screws the member A of the joint will be firmly and rigidly attached to the forward section F of the axe handle. The outer surfaces of the prongs will have the desired curvature to conform with that of the wooden section of the axe handle so there will be a smooth junction between the wood part and the metal part of the member A of the joint.

As best shown in Figure 3, the other member B of the joint which is to cooperate with the previously described member A has a body 18 preferably made with the same material as the member A. The body at its forward end has an extension E of general rectangular cross section, as can best be seen from Figure 7. The dimensions of the extension are substantially the same as the rectangular open end of the socket in the joint member A. In this way the extension E can have a snug sliding fit through the open end of the socket and into the socket. The length of the socket will be such as to receive the entire length of the extension E and when so received the forward end of the body 18 of the joint member B will be in abutting relation to the rear end of the body 10 of the joint member A.

The extension E is provided with a longitudinal slot 19 extending completely through the width of the extension. This slot divides the extension into parts 20 and 21 and permits these parts to be expanded, that is, spread apart. The slot 19 extends only to a point relatively close to the body part of the joint member and at this end of the slot it is enlarged, as shown, in order to slightly weaken the parts 20 and 21 and permit the spreading apart to be easily accomplished. Also, this enlarged end of the slot insures that there will be little tendency of the metal breaking or splitting adjacent the body as a result of forces being present due to the spreading action. Adjacent the forward end of the slot 19 it is enlarged by curved surfaces to provide cam surfaces 22 and 23. These cam surfaces are in the form of arcs, each of which has its center spaced on the opposite side of the axis of the slot 19. At the extreme forward end of the slot 19 it is enlarged to provide a wide mouth 24, the purpose of which is to permit the expanding cam, to be presently described, to assume proper position with respect to the cam surfaces.

The body of the joint member B also is provided with two rearwardly extending prongs 25 and 26 which will be identical with the prongs already described as extending forwardly from the body of the joint member A. These prongs have holes 27 for receiving screws 28. With these rearwardly extending prongs the joint member B can be attached to the wooden rear section R of the handle, the prongs being received in suitable grooves, all as shown in Figure 1.

The expanding means for locking the two members of the joint together, and best shown in Figures 5 and 6, constitutes a rotatable member 29. This rotatable member is journaled in the body of the joint member A and is arranged to extend across the socket and to be towards the closed end of the socket. The rotatable member has an end portion 30 provided with a screw driver slot 31 and arranged to be journaled in one side wall of the socket. The central part of the rotatable member, that is, the portion which lies in the socket, is constructed to have a cam 32. The cam has a greater dimension in one direction than in the other, with the greatest dimension being substantially the same as the end bearing so that the rotatable member including the cam can be positioned in the joint member. To hold the rotatable member in position there is a headed screw 33 which will also act as a bearing member in the other side wall of the socket.

The narrowest part of the cam will be such that when the cam has its greatest dimension in the longitudinal direction of the socket, the wide mouth 24 at the front end of the extension E on the joint member B can receive the cam when the extension is inserted into the socket. When the extension is wholly in the socket, the cam of the rotatable member will lie between the two curved cam surfaces on the extension parts. When the cam is given a rotation by means of a screw driver cooperating with the screw driver slot 31 the cam will so cooperate with the curved cam surfaces and produce a spreading of the two extension parts, with the result that these extension parts will be moved outwardly and into a tight engagement with the diverging bottom and top walls 12 and 13 of the socket. The engagement of the extension parts with the diverging surfaces of the socket will take place as the long dimension of the cam approaches the vertical. At this point the greatest leverage will also be produced by the cam, thus insuring there will be high pressures present to establish a tight grip between the extension parts and the diverging surfaces of the socket. By spreading the parts of the extension the inner end of the extension will have a greater over-all size and it will be conditioned so as to establish a "knob-like" end on the extension. There will then be a rigid connection between the two joint members and also such a connection as to prevent any possibility of the joint members becoming separated or even loosened. The top and bottom walls of the socket will be diverging in a direction away from the mouth of the socket and with the extension parts spread apart these diverging surfaces will oppose any withdrawal of the extension parts.

When certain metals are used, or when the joint members are of laminated construction, it may be possible that such high pressures will be effective on the bottom and top walls of the socket that a cracking or breaking of the side walls of the socket could occur. To oppose any such high pressures, which may tend to spread the socket, the joint member B will be provided with lugs 34 and 35 and the top and bottom of the joint member A at the open end of the socket will have receiving slots for these lugs, which slots are indicated at 36 and 37. The lugs have diverging surfaces 38 and 39 which diverge in the direction of the extension and the slots will have diverging surfaces 40 and 41 which will diverge in the direction away from the open end of the socket. The angle of the surfaces 38 and 40 will be the same with respect to the axis of the joint and the same is true of the surfaces 39 and 41. The angle of divergence of the surfaces on the lugs and the surfaces at the bottom of the slots on the joint member A is considerably greater than the angle of divergence of the top and bottom walls 12 and 13 of the socket. With the lugs and the slots as shown, it will be seen when the joint is in operative condition the lugs will fit into the slots and the diverging surfaces will be in engagement with each other. Thus the lugs will oppose any pressures which tend to break, crack or split the body of the joint member A at the open end of its socket.

Although the joint members of our improved joint are shown attached to parts or sections which are desired to be separably connected together, it is to be understood that the joint members may constitute integral end parts of sections or parts desired to be joined. Furthermore, the extensions and receiving socket of the joint may take other shapes than those shown. Thus, being aware of the possibility of modifications in our joint as shown by way of example as part of an axe handle, it is to be understood that the scope of our invention is not to be limited in any manner except in accordance with limitations as defined in the appended claims.

What is claimed is:

1. In a detachable joint, cooperating interengaged members, one of said members having a body provided with an axially extending socket of rectangular cross section with two of the opposed side walls thereof being in diverging relation in a direction toward the inner end of the socket, the other of said members having a body provided with an extension of such rectangular cross section throughout its length as to be receivable into the socket through its open end and being provided with a longitudinally extending slot to thereby form the extension into two parts, manually operable means carried by the member with the socket for spreading the parts of the extension when in the socket so as to place the outer surfaces thereof in tight engagement with the diverging walls of the socket throughout substantially the length of the socket, and means comprising forwardly extending lugs on said other member and receiving slots in the body of the first member at the open end of the socket for confining the body at the open end of the socket and thereby resisting expanding forces which may be established at the open end of the socket as a result of the spreading of the extension parts, said lugs and receiving slots having cooperating surfaces that diverge in the same directions as the socket walls but at a greater angle.

2. In a detachable joint, cooperating interengaging members, one of said members having a body provided with an axially extending socket of rectangular cross section with two of the opposed side walls thereof being in diverging relation in a direction toward the inner end of the socket, the other of said members having a body provided with an extension of such rectangular cross section throughout its length as to be receivable into the socket through its open end and being provided with a longitudinally extending slot to thereby form the extension into two parts, and manually operable means for spreading the parts of the extension when in the socket so as to place the outer surfaces thereof in tight engagement with the diverging walls of the socket throughout substantially the length of the socket, said last named means comprising a rotatable member carried against axial movement by the first named member and extending across the socket with bearings at both sides of the socket so as to be received in the slot of the extension and being so formed with cam means to cooperate with the sides of the slot that upon rotation it will cam the extension parts away from each other.

3. In a detachable joint, cooperating interengaging members, one of said members having a body portion provided with an axially extending socket of rectangular cross section with two of the opposed side walls thereof being in diverging relation in a direction toward the inner end of the socket, the other of said members having a body portion provided with an extension of such rectangular cross section throughout its length as to be receivable into the socket through its open end and being provided with a longitudinally extending slot to thereby form the extension into two parts, and manually operable means for spreading the parts of the extension when in the socket so as to place the outer surfaces thereof in tight engagement with the diverging walls of the socket throughout substantially the length of the socket, said other member having on its body portion, means in the form of integral lugs carried by the body portion having the extension and cooperating with the body portion of said first member adjacent the open end of the socket for opposing expansion forces which might act on opposite sides of the socket at said open end as a result of the spreading of the extension parts when the joint members are cooperating to establish the joint.

4. In a detachable joint, two cooperating interengaging members, one of said members having a body portion provided with a socket, the second joint member having a body portion provided with an integral extension formed of two juxtaposed parts capable of expansion, said extension being of an overall circumference to slide through the open end of the socket and said socket being of a size inwardly of the open end to allow for expansion of the parts of the extension and thereby produce a knob-like end, and means for expanding the extension parts when in the socket comprising a rotatable member carried solely by the first joint member against axial movement and extending into the socket and receiving the extension parts on each side thereof when said parts are placed in the socket, said rotatable member and the inner surfaces of the extension parts being provided with cooperating cam means which will produce spreading of the extension parts only outwardly of the body portion to which they are integrally connected upon rotation of the rotatable member.

5. In a detachable joint, cooperating interengaging members, one of said members having a body provided with an axially extending socket having a cross sectional area which is greater at a point remote from its open end than at said open end, the other of said members having a body provided with juxtapositioned extension parts integral at one end with the body and of a combined cross sectional size throughout their length substantially that of the open end of the socket to permit their insertion into the socket, and manually operable means comprising a rotatable member carried solely by the first member so as to be fixed against axial movement and positioned to extend across the socket and to be between the extension parts upon their insertion in the socket, said rotatable member carrying cam means so related to the parts that when between the parts said cam means upon rotation only of the rotatable member will force the extension parts away from each other and into a gripping action with the interior wall of the socket when the extension parts are in the socket, said extension parts and the interior of the socket being so constructed that when the extension parts are forced apart large surfaces of the extension parts will be in contact with interior surfaces of the socket and the contacting surfaces will have such angular relationship to the axis of the socket as to oppose withdrawal of the extension parts from the socket.

References Cited in the file of this patent

UNITED STATES PATENTS

| Number | Name | Date |
|---|---|---|
| 236,105 | Stohlmann | Dec. 28, 1880 |
| 267,060 | Buell | Nov. 7, 1882 |
| 1,164,161 | Ayers | Dec. 14, 1915 |
| 1,233,876 | Hause | July 17, 1917 |
| 1,788,565 | Davis | Jan. 13, 1931 |
| 2,434,152 | Forry | Jan. 6, 1948 |

FOREIGN PATENTS

| Number | Country | Date |
|---|---|---|
| 22,303 | Great Britain | July 29, 1897 |
| 178,018 | Germany | Nov. 8, 1906 |